United States Patent
Kalo et al.

(10) Patent No.: US 11,502,296 B2
(45) Date of Patent: Nov. 15, 2022

(54) PROCESS FOR MAKING A MIXED METAL OXIDE

(71) Applicant: BASF SE, Ludwigshafen am Rhein (DE)

(72) Inventors: Benedikt Kalo, Ludwigshafen (DE); Joerg Heilek, Ludwigshafen (DE)

(73) Assignee: BASF SE, Ludwigshhafen (DE)

( * ) Notice: Subject to any disclaimer, the term of this patent is extended or adjusted under 35 U.S.C. 154(b) by 0 days.

(21) Appl. No.: 16/982,831

(22) PCT Filed: Mar. 20, 2019

(86) PCT No.: PCT/EP2019/056978
§ 371 (c)(1),
(2) Date: Sep. 21, 2020

(87) PCT Pub. No.: WO2019/185421
PCT Pub. Date: Oct. 3, 2019

(65) Prior Publication Data
US 2021/0057743 A1    Feb. 25, 2021

(30) Foreign Application Priority Data
Mar. 26, 2018   (EP) .................................. 18163858

(51) Int. Cl.
*H01M 4/525* (2010.01)
*C01G 53/00* (2006.01)
*H01M 4/505* (2010.01)
*H01M 10/0525* (2010.01)
*H01M 4/02* (2006.01)

(52) U.S. Cl.
CPC ............. *H01M 4/525* (2013.01); *C01G 53/42* (2013.01); *C01G 53/44* (2013.01); *H01M 4/505* (2013.01); *H01M 10/0525* (2013.01); *C01P 2002/50* (2013.01); *C01P 2004/61* (2013.01); *C01P 2006/40* (2013.01); *H01M 2004/021* (2013.01)

(58) Field of Classification Search
CPC .................................................... H01M 4/525
See application file for complete search history.

(56) References Cited

U.S. PATENT DOCUMENTS

| | | | |
|---|---|---|---|
| 2010/0273057 A1 | 10/2010 | Watanabe et al. | |
| 2011/0315938 A1 | 12/2011 | Schroedle et al. | |
| 2012/0074351 A1 | 3/2012 | Levasseur et al. | |
| 2012/0270107 A1 | 10/2012 | Toya et al. | |
| 2017/0338485 A1 | 11/2017 | Toya et al. | |
| 2018/0205080 A1 | 7/2018 | Toya et al. | |

FOREIGN PATENT DOCUMENTS

| | | | | |
|---|---|---|---|---|
| EP | 2 421 077 A1 | 2/2012 | | |
| EP | 2819222 A1 | * 12/2014 | ........... | C01G 45/006 |

OTHER PUBLICATIONS

Lindsey "Climate Change: Atmospheric Carbon Dioxide" accessed from https://www.climate.gov/news-features/understanding-climate/climate-change-atmospheric-carbon-dioxide on Jul. 30, 2021. (Year: 2020).*
International Search Report dated Jun. 13, 2019 in PCT/EP2019/056978 filed Mar. 20, 2019.
International Preliminary Report on Patentability dated Jun. 23, 2020 in PCT/EP2019/056978 filed Mar. 20, 2019.
Extended European Search Report dated Jul. 16. 2018 in European Patent Application No. 18163858.6, 3 pages.

* cited by examiner

*Primary Examiner* — Peter F Godenschwager
(74) *Attorney, Agent, or Firm* — Finnegan, Henderson, Farabow, Garrett & Dunner LLP

(57) ABSTRACT

A process for making a mixed metal oxide, may involve: (a) providing a hydroxide or oxyhydroxide of TM with an average particle diameter (D50) in the range of from 0.1 μm to 5 mm; (b) subjecting the hydroxide or oxyhydroxide of TM to a stream of gas with a temperature in the range of from 150 to 2000° C., wherein TM contains nickel and at least one further transition metal selected from cobalt and manganese.

19 Claims, No Drawings

PROCESS FOR MAKING A MIXED METAL OXIDE

The present invention is directed towards a process for making a mixed metal oxide, said process comprising the following steps:
(a) providing a hydroxide or oxyhydroxide of TM with an average particle diameter (D50) in the range of from 0.1 µm to 5 mm,
(b) subjecting said hydroxide or oxyhydroxide of TM to a stream of gas with a temperature in the range of from 150 to 2000° C.,
wherein TM contains nickel and at least one further transition metal selected from cobalt and manganese.

Lithium ion secondary batteries are modern devices for storing energy. Many application fields have been and are contemplated, from small devices such as mobile phones and laptop computers through car batteries and other batteries for e-mobility. Various components of the batteries have a decisive role with respect to the performance of the battery such as the electrolyte, the electrode materials, and the separator. Particular attention has been paid to the cathode materials. Several materials have been suggested, such as lithium iron phosphates, lithium cobalt oxide, lithium nickel cobalt aluminium oxides, and lithium nickel cobalt manganese oxides. Although extensive research has been performed the solutions found so far still leave room for improvement.

In many cases, lithium-containing mixed transition metal oxides are used as the active material. Very commonly used cathode active materials are lithiated nickel cobalt aluminium oxides ("NCA") and lithiated nickel cobalt manganese oxides ("NCM"). Such materials are generally produced by first producing a precursor, for example a mixed carbonate or mixed oxyhydroxide or mixed hydroxide of nickel and cobalt, and, optionally, aluminum or manganese, and mixing the precursor with a lithium compound, for example with LiOH or $Li_2CO_3$, and then treating the mixture thermally at temperatures in the range from 750 to 1000° C. The latter step is also referred to as calcination.

It is desirable, though, to improve the throughput in the calcination step. Long residence times are undesirable because the energy consumption is high. It has been suggested to pre-calcine the precursor, for example in a rotary kiln or in a roller hearth kiln. However, such pre-calcination also requires a lot of energy. In addition, the investment for an extra oven is high.

It was therefore an objective to provide a process that overcomes the disadvantages outlined above.

Accordingly, the process as defined at the outset has been found, hereinafter also referred to as inventive process or process according to the present invention. The inventive process comprises the steps of
(a) providing a hydroxide or oxyhydroxide of TM with an average particle diameter (D50) in the range of from 0.1 µm to 5 mm,
(b) subjecting said hydroxide or oxyhydroxide of TM to a stream of gas with a temperature in the range of from 150 to 2000° C.,
wherein TM contains nickel and at least one further transition metal selected from cobalt and manganese.

The above steps will hereinafter also be referred to as step (a) or step (b), respectively.

Step (a) includes providing a hydroxide or oxyhydroxide of TM wherein TM contains nickel and at least one further transition metal selected from cobalt and manganese. Hydroxides and oxyhydroxides of TM are known per se. They may be obtained by co-precipitation of TM with alkali metal hydroxide in the absence or presence of ammonia. Oxyhydroxides in the context of the present invention are not limited to such species with a molar ratio of oxide and hydroxide of 1:1 but include all species $TM(O)_{x1}(OH)_{x2}$ with both $x1 \neq 0$ and $x2 \neq 0$. TM has an oxidation state of at least 2.0.

The average particle diameter (D50) in the context of the present invention refers to the median of the volume-based particle diameter, as can be determined, for example, by light scattering. The average particle diameter (D50) of hydroxide or oxyhydroxide provided according to step (a) is in the range of from 0.1 µm to 5 mm, preferably from 1 µm to 1 mm, more preferably from 2 µm to 25 µm and even more preferably from 3 µm to 15 µm.

The particle diameter distribution of hydroxide or oxyhydroxide of TM may be narrow or broad. The particle diameter distribution—hereinafter also referred to as particle size distribution—may be expressed as ratio of (D90–D10)/D50 and may be in the range of from 1.0 to 1.3—corresponding to a narrow particle size distribution, or it may be from 1.4 to 1.6 or even more—corresponding to a broad particle size distribution.

Said hydroxide or oxyhydroxide may be provided as particles dispersed in a liquid, as a paste or as a slurry or as a particulate material. A particulate material may be obtained by filtration of a freshly co-precipitated hydroxide or oxyhydroxide of TM, or it may be obtained by a spray-drying process of a freshly co-precipitated hydroxide or oxyhydroxide of TM, or by a combination of filtration, washing and spray-drying of a co-precipitated hydroxide or oxyhydroxide of TM. Particles dispersed in a liquid may have a total solids content of 0.1 to 10% by weight. A paste or slurry may be obtained by incomplete removal of liquid after co-precipitation. Slurries and particles dispersed in a liquid preferably are aqueous slurries or particles dispersed in water, respectively. Aqueous slurries may have a total solids content in the range of from 10 to 60% by weight, and pastes—preferably aqueous pastes—may have a total solids content in the range of from 61 to 95% by weight, each determined by drying a sample of 100 g or less in air atmosphere at 200° C. for 3 hours.

In one embodiment of the present invention TM contains at least 15 mole-% Ni, preferably at least 50 mole-% and even more preferably at least 60 mole-%. In one embodiment of the present invention, the maximum Ni contents in TM is 99 mole-%, preferably 95 mole-%.

Said TM may contain traces of other metal ions, for example traces of ubiquitous metals such as sodium, Ca or Zn, but such traces will not be taken into account in the description of the present invention. Traces in this context will mean amounts of 0.05 mol-% or less, referring to the total metal content of TM.

TM may contain one or more metals other than transition metals, for example Mg, Al or Ba or a combination of at least two of the foregoing.

In one embodiment of the present invention, TM contains Ni, Co and Al. In another embodiment of the present invention, TM contains Ni, Co and Mn.

In a preferred embodiment of the present invention, TM is a combination of metals according to general formula (I)

$$Ni_aCo_bMn_cM_d \qquad (I)$$

with
a being in the range of from 0.2 to 0.95, preferably 0.33 to 0.8, b being in the range of from 0.025 to 0.4, preferably 0.1 to 0.33, c being in the range of from zero to 0.6, preferably 0.1 to 0.33, and d being in the range of from zero to 0.2, preferably 0.001 to 0.005, M selected from Ba, Al, Ti, Zr, W, Fe, Cr, K, Mo, Nb, Mg, Na and V, including combinations of at least two of the foregoing, preferably M is selected from Al, W, Ti and Zr and combinations of at least two of the foregoing, and $$a+b+c+d=1.$$

In another preferred embodiment of the present invention, TM is selected from

$$Ni_h Co_i Al_j$$

Typical values for h, i and j are:

h is in the range of from 0.8 to 0.90, i is in the range of from 0.15 to 0.19, and j is in the range of from 0.01 to 0.05.

In a particularly preferred embodiment of the present invention, TM is selected from $Ni_{0.33}Co_{0.33}Mn_{0.33}$, $Ni_{0.5}Co_{0.2}Mn_{0.3}$, $Ni_{0.6}Co_{0.2}Mn_{0.2}$, $Ni_{0.8}Co_{0.1}Mn_{0.1}$, and $Ni_{0.7}Co_{0.2}Mn_{0.1}$. In another embodiment, TM is selected from $Ni_{0.2}Co_{0.1}Mn_{0.7}$, $Ni_{0.25}Co_{0.15}Mn_{0.6}$ and $Ni_{0.4}Co_{0.2}Mn_{0.4}$, $(Ni_{0.85}Co_{0.15})_{0.97}Al_{0.03}$, and $(Ni_{0.85}Co_{0.15})_{0.95}Al_{0.05}$.

In step (b) of the inventive process, said hydroxide or oxyhydroxide of TM is subjected to a stream of gas with a temperature in the range of from 150 to 2000° C., preferably it is in the range of 300 to 1500° C., more preferably in the range of 350 to 900° C. The gas temperature is determined at the beginning of step (b) and decreases in the course of the interaction with said hydroxide or oxyhydroxide of TM during step (b). At the beginning of said step (b), said gas stream may also be referred to as "feed gas stream".

By subjecting hydroxide or oxyhydroxide of TM to a stream of gas said hydroxide or oxyhydroxide of TM is moved through a reactor, and both chemically bound and physically adsorbed water is removed from said hydroxide or oxyhydroxide of TM. Formation of an oxide or oxyhydroxide of TM with low residual moisture is observed, for example with a residual moisture content in the range of from 0.01 to 1% by weight, determined by weight loss at 150° C. under $CO_2$-free air for three hours.

Step (b) is performed in a reactor. Such reactor may have any shape provided such shape allows for the transport of particles of hydroxide or oxyhydroxide and of oxide of TM.

Step (b) may be carried out in various ways. It is possible to carry out the inventive process in a fluidized bed, especially in a spouted bed. In the course of the removal of water, larger particles break up to smaller particles, for example with an average diameter in the range of from 0.1 to 25 μm, preferably 2 to 20 μm, and they are removed pneumatically from the reaction vessel. After such removal, they are collected in a device for removing dust from off-gas, for example an electrostatic dust precipitator, to a cyclone, or to gas-solid filter units, for example a baghouse filter, especially a fabric baghouse filter.

In a preferred embodiment, step (b) is carried out as flash dehydration. Such flash dehydration is performed in a tubular reactor or pipe that may be installed vertically or horizontally or in an installation combining both a horizontally and vertically installed pipe. Preferred is a vertically installed pipe. The stream of gas moves the hydroxide or oxyhydroxide of TM along the tubular reactor or pipe, preferably as pneumatic transport. During such pneumatic transport, larger particles—if present—may break up to smaller particles, for example with an average diameter in the range of from 2 to 20 μm, preferably 2 to 10 μm.

In a preferred embodiment, step (b) is carried out as spin flash dehydration. Such spin flash dehydration is performed in a tubular reactor or pipe when the entrained flow main direction of the gas stream is circulation around a center axis. The circulation motion may be enforced by a rotating shaft with flights, paddles or blades, along the center axis of the reactor.

The gas used for the gas stream may be selected from air, oxygen, oxygen-enriched air, oxygen-depleted air, nitrogen, mixtures from argon and air or from argon and nitrogen, flue gas, and pre-treated air. Preferred are flue gas, nitrogen, air and pre-treated air. In the context of the present invention, the term "pre-treated air" refers to air with a carbon dioxide content of 0.1 to 500 ppm. Preferred in pre-treated air is a carbon dioxide content in the range of from 0.1 to 50 ppm by weight. Preferred are air, a mixture of air and oxygen, and flue gas.

In one embodiment of the present invention, the feed gas stream has a $CO_2$ content in the range of from 0.1 to 500 ppm by weight. Such feed gas streams may be selected from air, oxygen, oxygen-enriched air, oxygen-depleted air, nitrogen, mixtures from argon and air or from argon and nitrogen.

In embodiments wherein the feed gas stream is flue gas the $CO_2$ content is usually higher than 500 ppm by weight.

Depending on the characteristics and especially on the water content of the hydroxide or oxyhydroxide of TM, it may be contacted with the gas stream in different ways. For solids, a screw conveyor, a vibrating chute or a rotary valve may be applied. In embodiments wherein hydroxide or oxyhydroxide of TM is provided dispersed in a liquid or as a slurry, spray nozzles may be applied. For slurries or pastes, gas enforced nozzles may be applied, e.g. using steam as dispersion aid medium. The solid feed may be injected before or after heating the gas stream. Preferably, hydroxide or oxyhydroxide of TM is injected into the gas stream after heating said gas stream.

In a preferred embodiment of the present invention the gas stream in step (b) has a velocity sufficient to pneumatically transport the hydroxide or oxyhydroxide of TM together with the mixed metal oxide—and, optionally, together with LiOH hydrate and anhydrous lithium hydroxide or lithium carbonate—through the reactor. The velocity of the gas stream may be in a range of from 1 m/s to 100 m/s, preferably it is in a range of 5 m/s to 35 m/s at process conditions, referring to velocity in an empty tube.

In one embodiment of the present invention, the average residence time of the hydroxide or oxyhydroxide of TM in the reactor in which step (b) is performed is in the range of from 0.1 seconds to 10 minutes, preferably from 0.5 seconds up to 5 minutes and even more preferred from 1 second to 2 minutes. The average residence time refers to the average time that the oxide of TM—as such or as hydroxide or oxyhydroxide of TM—spends in the stream of gas. Preferably, the average residence time is defined by the time period during which the particles of oxide of TM—as such or as hydroxide or oxyhydroxide of TM—are airborne and conveyed by the gas stream (from initial dispersion after dosage to the removal from the gas stream.

If desired, it is useful to combine a comparably low temperature of the gas stream with a higher residence time, for example 200 to 250° C. and an average residence time from 8 to 10 minutes.

On the other hand, if a comparable short residence time is the target, a higher gas stream temperature is required, for example 0.1 to 5 seconds and 1000 to 2000° C.

In one embodiment of the present invention, the gas stream may be heated by a combustion reaction within the respective gas stream, for example using a natural gas burner. In another embodiment of the present invention, the gas stream may be heated electrically by heating elements being in direct contact with the gas stream. In another embodiment of the present invention, the gas stream may be heated using a heat exchanger with the heat being supplied either by flue gas from a combustion reaction or electrical heating. Combinations of at least two of the foregoing are possible as well.

In a preferred embodiment of the present invention, the gas stream is pre-heated by a heat exchanger recovering the heat of the off-gas stream after gas-solid separation.

The heat transfer to liquids and solids is dominated by convective and radiative heat transfer.

In one embodiment of the present invention, in step (b) said hydroxide or oxyhydroxide of TM is subjected to a stream of gas with a temperature in the range of from 150 to 2000° C. in the absence of lithium compounds such as LiOH·aq or $Li_2CO_3$.

In one embodiment of the present invention, in step (b) said hydroxide or oxyhydroxide of TM is subjected to a stream of gas with a temperature in the range of from 150 to 2000° C. together with LiOH·aq or $Li_2CO_3$. In the context of the present invention, LiOH·aq—or hydrate of LiOH—does not only refer to lithium hydroxide monohydrate LiOH·$H_2O$ but also to materials that contain less or more water such as partly dehydrated monohydrate or moist lithium hydroxide monohydrate. The upper limit of water content is determined by the phase change from solid to liquid. Preferably, the average formula is LiOH·x $H_2O$ with x being in the range of from 0.8 to 1.2. Even more preferred is stoichiometric LiOH·$H_2O$.

If applicable, LiOH·aq or $Li_2CO_3$ is provided as particulate material.

The term "particulate" in the context of LiOH·aq or $Li_2CO_3$ refers to a material with an average particle diameter (D50) in the range of from 100 nm to 5 mm, preferably 1 µm to 1 mm and even more preferably from 5 µm to 1 mm. Such material may be obtained by breaking up commercially available LiOH·aq or $Li_2CO_3$, for example by milling. Non-limiting examples of suitable mills are air classifier mills, jet mills, pin mills, and rotor-stator mills.

In one embodiment of the present invention, the amount of LiOH·aq or $Li_2CO_3$ added corresponds to the amount of lithium required for the manufacture of cathode active material. A reaction between oxide or (oxy)hydroxide of TM and LiOH·aq or $Li_2CO_3$ in step (b) usually does not occur due to the short residence time.

After finishing step (b) of the inventive process, work-up steps may follow, for example cooling the resultant oxide of TM, and one or more gas-solid-separation steps.

At the end of step (b), the resultant oxide of TM so obtained may be recovered and cooled to ambient temperature under inert gas or air, for example nitrogen or air with a carbon dioxide content of 0.01 to 500 ppm. Recovery of oxide of TM is achieved by gas-solid separation.

Gas solid-separation may be conducted by all techniques known per se. Preferred means for gas-solid separation are cyclones and filters, with baghouse filters being preferred.

In a preferred embodiment, the gas stream may be cooled by mixing it with additional gas at lower temperature level, before entering a dust precipitator, for example a baghouse filter, or cyclone separator. Subsequently, water may be condensed by directly or indirectly cooling the gas stream. After having removed the water at least partially, the gas may be released to the atmosphere or may be re-used in the inventive process.

In one embodiment of the present invention, after step (b), the gas stream is quenched. The gas stream may be quenched before or after a gas-solid separation. It preferably is quenched before gas-solid separation. Quenching may be conducted by mixing the heated gas stream with cooler gas, preferably gas at ambient temperature. Preferably, the cooler gas is air, pre-treated air, or nitrogen. Quenching may also be conducted by injection of a liquid into the heated gas stream and evaporating the liquid. Preferably, the liquid is water, more preferably, the liquid is demineralized water.

The mixed oxide resulting from the inventive process may be cooled to a temperature as low as ambient temperature or to a higher temperature, for example it may be separated from the gas stream at 300 to 400° C. without further cooling after gas-solid separation. The product separated from the gas stream at 300 to 400° C. may be transferred to succeeding process steps for cathode active material manufacture without further cooling. The succeeding process steps may include calcination. If a succeeding process step includes calcination, it is preferred to transfer the product to the calcination step without further cooling after gas-solid separation at 300 to 400° C.

So-called anhydrous oxide of TM obtained according to the inventive process may have a residual moisture content of 0.01 to 1% by weight, determined by weight loss at 150° C. under $CO_2$-free air for three hours. The $CO_2$ content was checked by optical measurements based upon infrared light. It may be advantageously used for the manufacture of cathode active materials for lithium ion batteries, for example after mixing with a compound of lithium such as $Li_2O$, LiOH or $Li_2CO_3$.

The invention claimed is:

1. A process for making a mixed metal oxide, the process comprising:

subjecting a hydroxide or oxyhydroxide of TM with an average particle diameter (D50) in a range of from 0.1 µm to 5 mm, to a stream of gas with a temperature in a range of from 150 to 2000° C. in the absence of lithium compounds, and wherein TM has a composition of formula (I)

$$(Ni_aCo_bMn_c)_{1-d}M_d \qquad (I),$$

wherein a is in a range of from 0.2 to 0.95,
b is in a range of from 0.025 to 0.4,
c is in a range of from zero to 0.6, and
d is in a range of from zero to 0.2,
M is Mg, Al, Ba, W, Ti, Zr, or a combination thereof, and $$a+b+c=1.$$

2. The process of claim 1, wherein the subjecting is performed in a tubular reactor.

3. The process of claim 1, wherein the hydroxide or oxyhydroxide is provided as a solid dispersed in water, as a slurry, as a paste, or as particulate material.

4. The process of claim 1, wherein the gas stream is air, a mixture of air and oxygen, or a flue gas.

5. The process of claim 1, wherein the gas stream has a velocity sufficient to pneumatically transport the hydroxide or oxyhydroxide of TM together with the mixed metal oxide through the reactor.

6. The process of claim 1, wherein the feed gas stream comprises $CO_2$ in a range of from 0.1 to 500 ppm by weight.

7. The process of claim 1, wherein the average residence time of the hydroxide or oxyhydroxide of TM is in a range of from 0.1 seconds to 10 minutes.

8. The process of claim 1, wherein the stream of gas has a temperature in a range of from 350 to 900° C.

9. The process of claim 1, wherein the average particle diameter of the hydroxide or oxyhydroxide of TM is in a range of from 2 μm to 25 μm.

10. The process of claim 1, wherein the temperature in the subjecting is in a range of from 200 to 250° C. and an average residence time of the subjecting is in a range of from 8 to 10 minutes.

11. The process of claim 1, wherein the subjecting is conducted at a temperature in a range of from 1000 to 2000° C. and an average residence time of the subjecting is in a range of from 0.1 to 5 seconds.

12. The process of claim 1, wherein TM comprises Ni, Co, and Al.

13. The process of claim 1, wherein TM comprises nickel and cobalt.

14. The process of claim 1, wherein TM comprises nickel and manganese.

15. The process of claim 1, wherein TM comprises nickel, cobalt, and manganese.

16. The process of claim 1, wherein a hydroxide of TM is subjected.

17. The process of claim 1, wherein an oxyhydroxide of TM is subjected.

18. The process according to claim 1, wherein the process further comprises mixing the mixed metal oxide with a compound of lithium.

19. The process according to claim 1, wherein TM contains 0.05 mol-% or less of sodium.

* * * * *